United States Patent [19]

Corni

[11] 4,052,601
[45] Oct. 4, 1977

[54] CONTROL SYSTEMS FOR MACHINES AND PLANTS GENERALLY, PARTICULARLY DESCRIBED FOR APPLICATIONS ON MACHINE TOOLS

[75] Inventor: Vittorio Corni, Modena, Italy

[73] Assignee: Comau Industriale S.p.A., Turin, Italy

[21] Appl. No.: 557,377

[22] Filed: Mar. 11, 1975

[30] Foreign Application Priority Data

Mar. 18, 1974 Italy .................................. 67834/74

[51] Int. Cl.$^2$ ............................................ G05B 19/02
[52] U.S. Cl. ........................................ 364/104; 29/563
[58] Field of Search ............... 235/151.11; 340/172.5; 29/563

[56] References Cited

U.S. PATENT DOCUMENTS

| | | | |
|---|---|---|---|
| 3,372,568 | 3/1968 | Lemelson | 235/151.11 X |
| 3,576,978 | 5/1971 | Rosenberg | 235/151.11 |
| 3,793,625 | 2/1974 | Pomella et al. | 235/151.11 |

Primary Examiner—Eugene G. Botz
Attorney, Agent, or Firm—Cushman, Darby & Cushman

[57] ABSTRACT

A control system for machinery and plants generally, particularly for the applications to machine tools or welding machines for large mass production comprising a centralized unit pre-disposed for the general control of a unit of mechanical groups or machining stations; the connections between said central unit and the single mechanic groups or machining stations being embodied through local control units comprising control units for power services and a personalized logic standard unit with a programming device pre-disposed for a pre-selected sequence of stages on said single mechanical group or machining station; said logic unit comprising a step-by-step programmer operatively associated with said single machine or machining station in order to embody a sequence of operations as prefixed by means of said programming device.

6 Claims, 6 Drawing Figures fig. 2

CONTROL SYSTEMS FOR MACHINES AND PLANTS GENERALLY, PARTICULARLY DESCRIBED FOR APPLICATIONS ON MACHINE TOOLS

The present invention relates to an improvement in the control systems for machine tools.

Control systems are known for solving "logic" problems for controlling machine tools using either relays or electronic modules ("static controls"). The embodiment of specific plans is obtained by means of elaborated wirings which are inserted between the various components. For putting these systems into operation specialized labor is usually required in order to obtain the suitable complex connections by means of electric cables associated with specific equipment. Such elaborate wiring plans for controlling machine tools increases the production costs and times for putting such systems into operation.

The present invention aims to reduce to a remarkable extent the production costs and times, utilizing a single basic circuit, planned for this purpose and embodied in mass production with an automatic technique (printed circuits).

The system according to the present invention is oriented to the solution of logic problems concerned with the control of special machinery (for instance machine tools or automatic welding machines for mass production). This system is suitable to solve control problems with sequential operations, namely operations which can be obtained by the combination of a plurality of machining stages.

The system according to the present invention, as it will be more clearly disclosed later on, requires no particular knowledge of programming and lends itself to the connection to electronic computers (process computers) in order to supply data relating to the machine tool status when monitoring or diagnostic services are to be carried out independently from the control of the machine cycle.

Suitably, the circuit unit of the system according to this invention can be embodied on a single printed circuit board, utilizing modular circuit elements as usually available on the market and suitable for heavy duty industrial use.

The fundamental circuit of the system unit according to this invention consists of a step-by-step programmer with "n" operative stages which can be associated with a programming board suitable for directing the stage or step change signals, and to collect the control signals for the machine corresponding to a predetermined stages of operation the machine has reached.

It is therefore possible to set different arrangements of operative cycles by means of differently connectable boards, for instance by means of a multiple connector to the system unit.

The present invention will be now described with reference to one embodiment thereof at present preferred, disclosed only by way of non limitative example and with reference to the attached drawings, wherein.

Figure 1:
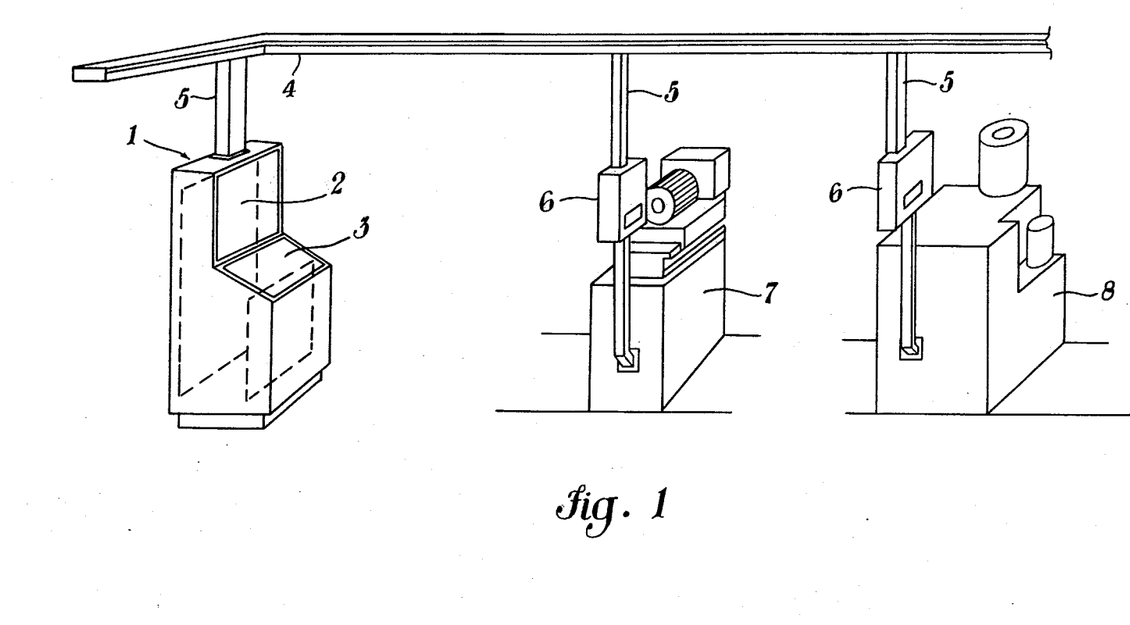
FIG. 1 diagrammatically shows by way of example the physical arrangement of a plant (destined for "transfer" type machines), using the system according to the present invention.

With reference to the drawings and particularly to FIG. 1, a generic plant using the system according to this invention comprises a survey or centralized control station 1, provided with a control panel 2, a general keyboard 3 and a channel 4 for the interconnection cables. From the channel 4 the branches 5 are derived which lead to the control modules 6 concerned with various operating machines 7, 8. In FIG. 1 only two operating machines have been shown, but it is understood that these machines are comprised in any desired number and sequence of machines or stations of a transfer machine or machining units.

The system according to this invention is used in the control modules 6 which can be assembled in like configuration to one another and "personalized" for the various configurations of machine operation by means of program boards as will be disclosed clearly later on.

Figure 2:
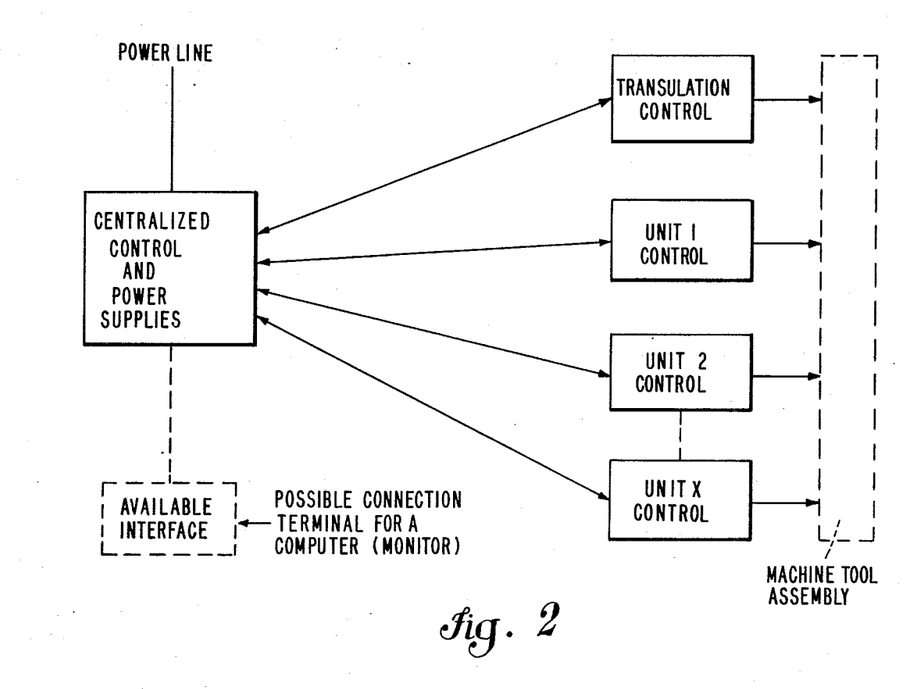
FIG. 2 shows the general logic interconnections of the unit of FIG. 1.

The arrangement as shown in FIG. 1 is diagrammatically shown under the organization standpoint in the block diagram of FIG. 2, where it is shown that the machinery is interconnected through a multiplicity of control units with centralized controls, associated if the case may be by branching of the signals to a terminal of a process computer.

Figure 3:
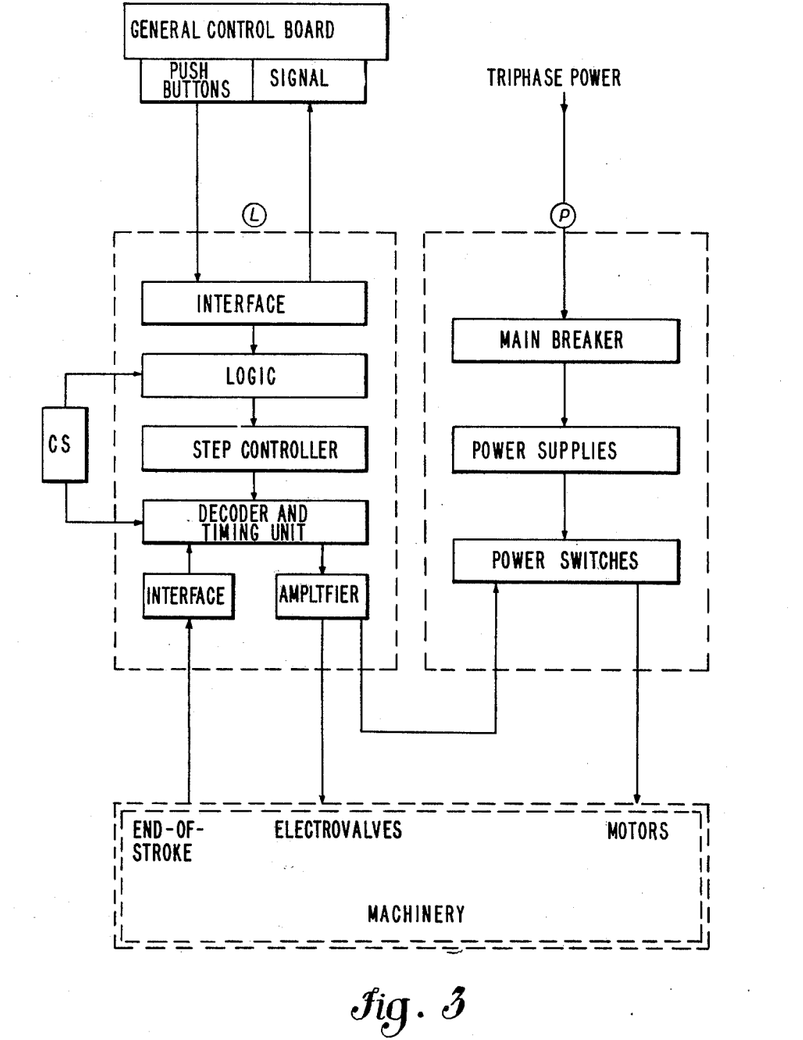
FIG. 3 shows the general block diagram concerned with one machine unit, according to the present invention.

The arrangement according to this invention concerned with a machine controlling unit is shown in detail in the block diagram of FIG. 3.

As shown in this figure, a generic machine tool is associated with a logic unit L and to a power unit P. Reference will be made to the logic unit L. This is associated to a Control Station comprising keys and adjustments through an interface associated to logic circuits co-operating with a "step controller" co-operating with a decoding unit associated to another machine interface. The logic and decoding circuits are interconnected in an easily modifiable way by means of a programming board CS carrying specific "written" instructions as it will be illustrated in detail hereinafter.

Figure 4A:
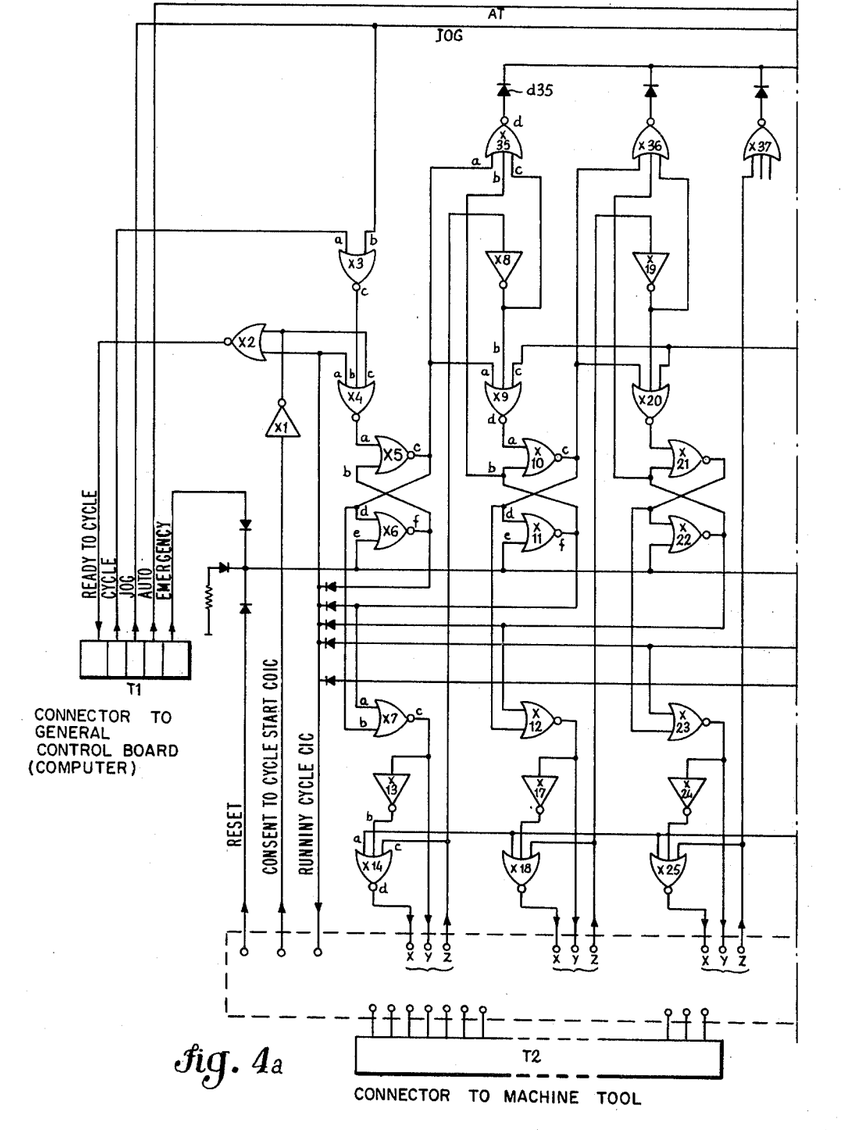
FIGS. 4a and 4b show the electric diagram of one control unit according to the present invention, in one embodiment thereof at present preferred.
Figure 4B:
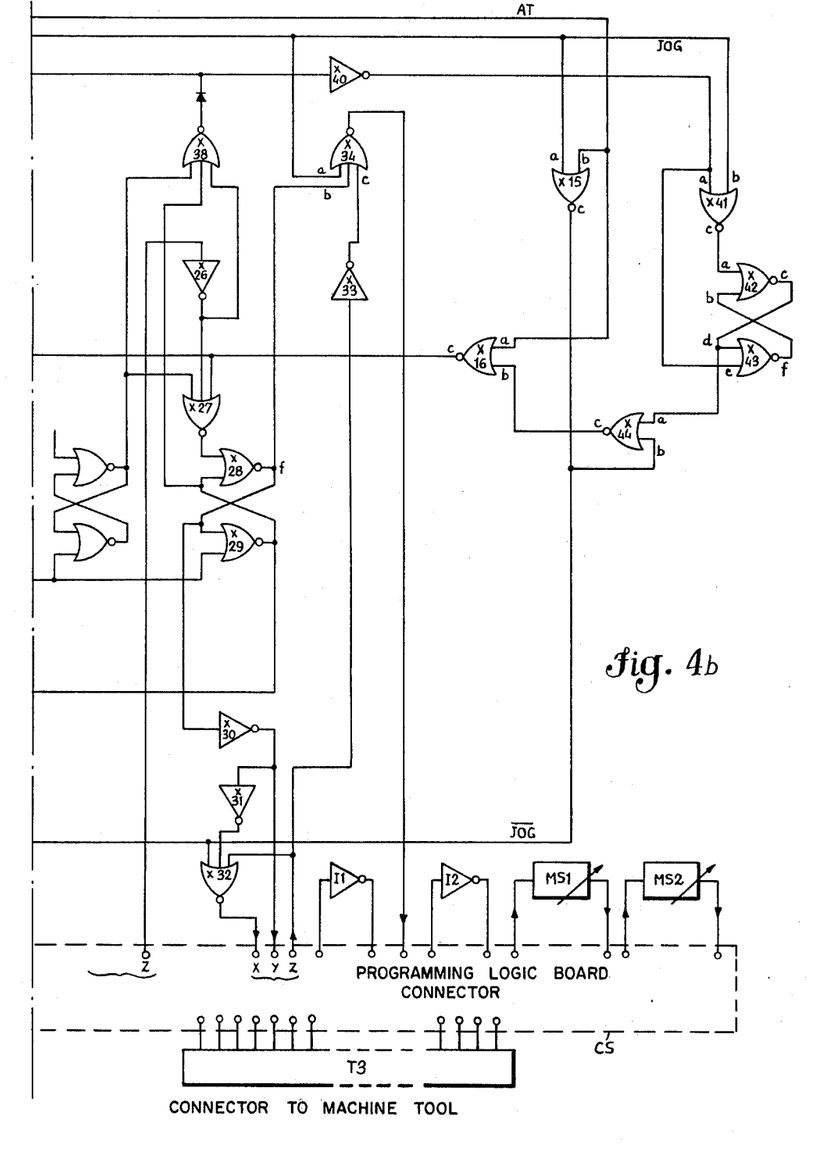

FIGS. 4a and 4b considered together with each other, show the electric diagram of a control unit according to the present invention, in an embodiment thereof at present preferred, and disclosed by way of non limitative example.

The control unit can be suitably embodied by printed circuit techniques, and can be provided with a connector CS for the insertion of a programming board having a pattern of diodes so located as to form a group of instructions which "personalizes" the control unit in its whole to carry out a determined task in connection with a machine tool.

As aforesaid the board can be replaced by another board provided with a different program concerned with another operating cycle.

The circuit shown in FIGS. 4a and 4b is connected through a connector T1 to the centralized general control board and to the local keys of the machine station; and through the connectors T2, T3 to one machine interface and an interface of machining controls, respectively, which are assumed to be known and that accordingly will not be described in detail.

The circuit structure of the machine control unit will now be described in detail.

It is assumed that by a RESET signal (temporarily HIGH) all memory circuits will be reset. Furthermore no machining cycle is running. It is also assumed to operate in AUTO (signal AT high). From the machine interface comes a CYCLE START CONSENT signal (signal COIC high). The signal of RUNNING CYCLE (CIC) is low. The signal COIC is inverted by the inverter X1 and is carried to AND by the gate NOR X2 together with the signal CIC. There is an output "high" from the gate X2 forming the signal READY TO CYCLE which will be sent to the central unit through the connector T1.

From the central unit, the EMERGENCY signal is "low", and also the signal JOG is "low".

At a certain moment, the central unit delivers the signal CYCLE which goes to "high" value. As JOG is "low" and CYCLE is "high", these signals applied to the inputs of the gate NOR X3 will originate a "low" output. Consequently the three inputs of the gate NOR X4 are all at low level, and this effects an AND operation whereby its output goes to "high" value carrying to "high" the input ($a$) of the gate NOR X5. The gate NOR X5 and the gate NOR X6 are interconnected in a known way to form a bistable circuit. In fact the output ($c$) of X5 is connected to the input ($d$) of X6, and the output ($f$) of X6 is connected to the input ($b$) of X5. The inputs ($a,c$) of X5 and X6 form the inputs of SET and RESET of the bistable formed by X5, X6, respectively.

As previously indicated, the memory circuits, among which is the bistable X5, X6 were in RESET. The "high" signal applied to the input ($a$) of X5 carries to SET the bistable X5, X6 and consequently the output ($c$) from X5 is "low" and the output ($f$) from X6 is "high".

At this point three conditions occur:

The signal CIC becomes "high" (diode D1) and therefore the gate X4 will be inhibited.

The terminals ($c, d$) of the gates X5, X6 are at "low" level.

The terminal ($f$) of the bistable X10, X11 is at "low" level.

Consequently the inputs ($a,b$) of the gate NOR X7 are both at "low" level; an AND operation occurs and the output ($c$) goes to "high" level. Therefore the function terminal "$y$" concerned with the STAGE 1 will be energized.

The output ($c$) from X7 will be inverted by the inverter X13 and applied to the input ($b$) of the three-input gate NOR X14. The input ($a$) of X14 is "low" as at a low value is the output ($c$) from the gate NOR X15, being its input ($b$) at a "high" value as the signal AUTO having a high value is present.

The input ($c$) of X14 is also at a "low" value as a feedback "Z" from the machine interface is not present yet. Therefore in X14 an AND operation will occur whereby the output ($d$) therefrom goes at a "high" value energizing thus the function terminal "$x$" concerned with the STAGE 1.

When the machine has completed the operation associated to the STAGE 1, there is a feed back on the terminal "$z$" of the STAGE 1, and accordingly the latter goes at "high" value.

This implies:

The immediate cut off of the gate X14 and the passage at a "low" value of the functional signal "$x$".

The application of a "high" signal to the inverter X8 and therefore a low signal to the input ($b$) of the gate NOR X9.

Now, the input ($a$) of X9 is low as the bistable X5, X6 is at SET, the input ($c$) of X9 is also "low" being at a "low" value the output from the gate NOR X16. Therefore, an AND operation will be carried out in X9 and the output ($d$) goes at "high" value. Thus a "high" signal will be applied to the input ($a$) of the gate NOR X10. The gate NOR X10 together with the gate NOR X11 forms a bistable and therefore the points ($a,b,c,d,e,f$) of X10, X11 will arrange themselves like previously disclosed for the bistable X5, X6. It is to be noted that as the terminal $a$ of X7 is at a high value, the output $c$ from X7 will be obtained at a low value and accordingly also $y$ will be at a low value.

This originates an AND operation in the gate NOR X12, the intervention of the inverter X17, the AND operation in the gate X18 and therefore the energizing of the function terminals "$x,y$" associated to the STAGE 2.

At the appearance of the signal "$z$" relative to the STAGE 2 there will be a further advance step according to the modes as previously described, which will involve the circuits X19, X20, X21, X22, X23, X24, X25.

The same operations will sequentially occur in the other stages, not shown in the figure and concerned with the stages or steps STAGE 3, STAGE 4 . . .

When the last stage, denoted as STAGE N is reached, the logic operators X26, X27, X28, X29, X30, X31, X32 will operate as previously described.

It is to be noted that in the last stage concerned with the STAGE N the logic operator corresponding to the gates NOR X7, X12, X23 is formed by the simple inverter X30, as the signal passing through it requires no conditioning by the subsequent stages.

When the feed back "$z$" concerned with the STAGE N appears, this besides cutting off in the known way the gate NOR X32, reaches the inverter X33 the output from which is applied to the input ($c$) of the NOR X34. To the inputs ($a,b$) of the NOR X34 go to the JOG signal, at "low" level, and the output ($f$) from the bistable X28, X29 at "low" level, as this bistable is now in SET, respectively. On X34 therefore an AND operation occurs and its output ($d$) goes to a "high" value. This signal will form the FINAL RESET carrying back to RESET all bistables of the programmer.

Now, the operation of the above described circuit will be described in semiautomatic operation, called also operation in JOG.

In this case differently from the automatic operation, the signal AUTO (AT) is a "low" level. The JOG signal will be at "high" level when a push button JOG (not shown) is depressed, and at a "low" level when the push button will be released.

Be it assumed that the whole plant is at rest, i.e. all flip flops in RESET. The CIC (Cycle in course) signal will be at "low" level as well as the RESET signal. On the contrary the (COIC) signal, the signal of consent to start of the cycle, will be on the contrary at "high" level. Also at "low" level are the inputs ($a,b$) of the gate NOR X3. If now the press button of JOC is operated, this signal goes to "high" level, the output ($c$) of X3 goes to a "low" level and the gate X4 can effect an operation of AND whereby the output ($d$) from said gate carries to "high" level the input (a) of the first bistable X5, X6.

Therefore the bistable X5, X6 concerned with the STAGE 1 is placed at SET.

Due to the aforesaid reasons the output (c) from the gate X7 is at a "high" value and therefore at "high" value is the function signal "x".

The consent of the gate NOR X14 to have a "high" signal on its output is conditioned by the situation that the three inputs (a,b,c) are all at "low" level. This will be possible only if the signal JOG (high level) is present; in fact the output (c) from the gate NOR X15 is at "low" level only if the signal JOG is at "high" level as now the (AT) AUTO signal is at "low" level.

The operator can thus control at will the presence of the function signal "x" simply by controlling the presence of the JOG signal (for instance by a press button).

The operation continues according to the above until a "z" return or feed back appears. At this point it is necessary to consider a further part of the circuit, which up to now has not been described. Before the feed back signal "z" appears the gate NOR X35 has its input (a) at "low" level, as the bistable X15, X16 is in SET, the input (b) "low" as the bistable X10, X11 of the STAGE 2 is still in RESET, and the input (c) is "high". Accordingly its output is "low". The output from the inverter X40 is then at "high" level whereby the bistable X42, X43 is in the condition: (c,d) "high" and (b,f) =low". This causes the input (a) of the gate NOB 44 to be at "high" level and therefore the output (c) of X44 is at "low" level. The output (c) from the gate NOR X16 is thus at "high" level and therefore the gate X9 having its input (c) at "high" level can carry out no AND operation.

When the "z" signal arrives, this will be inverted by the inverter X8 and arrives as a "low" level to the input (c) of the gate X35. Now, the three inputs (a,b,c) of X35 are at "low" level and therefore its output (d) goes to "high" level. The level "low" at the output from the inverter X8 does not act on the bistable X10, X11 through the gate X9 as the latter is cut off by the input (c) at "high" level.

Therefore the system will remain stationary in STAGE Q. The presence of the "high" level at the input of the inverter X8 causes a "low" level at its output and also at the input (a) of the gate X41.

The operations can continue only if the JOG signal falls ("low" level). In fact, if JOG goes to "low" level the gate NOR X41 effects an AND operation, and its output (c) goes to "high" level. This causes the state of the bistable X42, X43 to be reversed, namely now (c,d) will be "low" and (b,f) will be "high". At the gate NOR X44 the input (a) will be now at "low" level; the input (b) will be at "high" level if JOG will be missing (reversal in X15).

If now the signal JOG ("high" level) will be caused to appear again, the input (b) of the gate X44 will to to a "low" level. This causes the input (b) of the gate X16 to go to a "high" level and therefore the output (c) thereof to go to a "low" level. Therefore, the inputs (a,b,c) are all at "low" level and will place at SET the bistable X10, X11 associated with the STAGE 2. At this point the operations will proceed as previously described.

Figure 5:
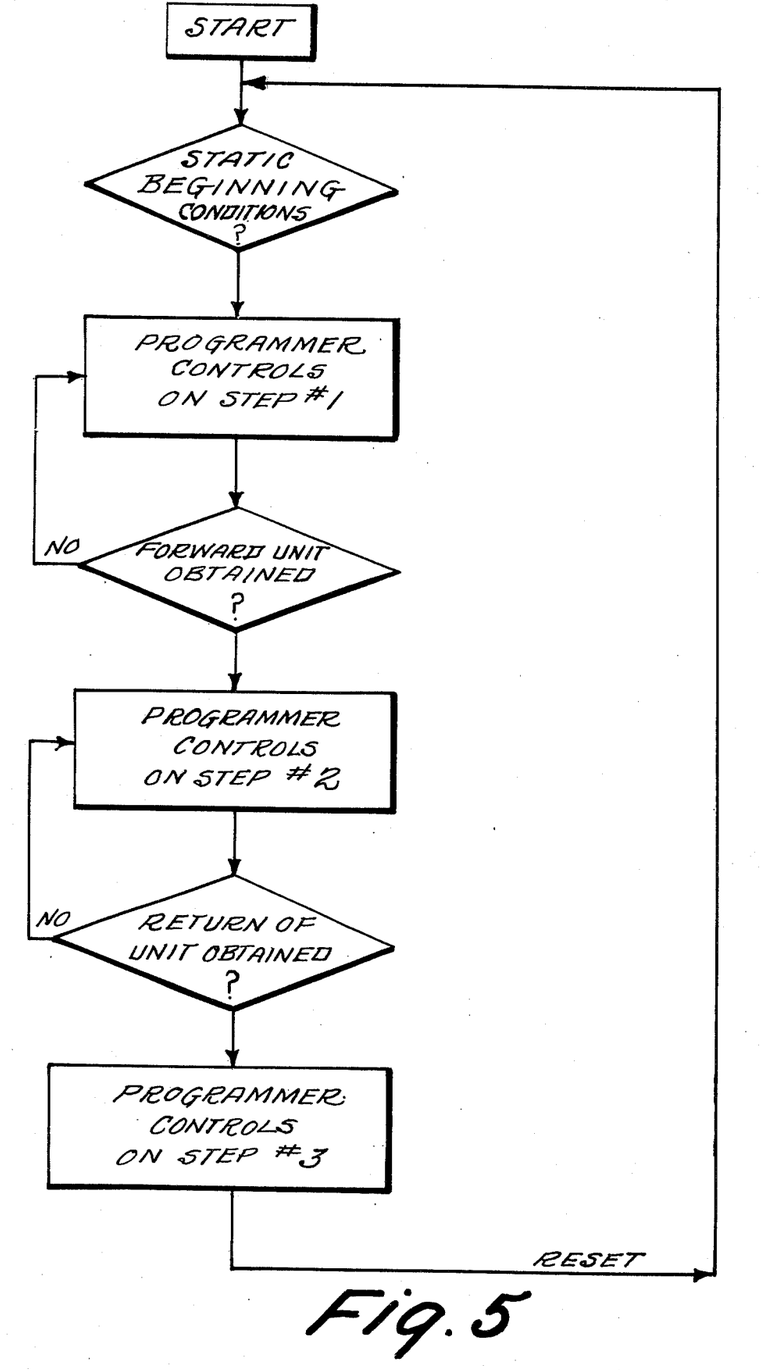
FIG. 5 is a flow chart illustrating the manner in which the stepped programmer of FIGS. 4a and 4b might be utilized in operating a machine comprising a slide with a boring and facing head driven by a two-speed electric motor.

FIG. 5 is a flow chart of two stages of a sequential programmer as discussed above in connection with FIGS. 4a and 4b, illustrating the manner in which the programmer would function with an operating unit for a simple boring operation. An operation of this kind entails the energization of a motor powering a boring tool head which is mounted on a slide, such as a hydraulically powered slide as known to a person skilled in this art. It is therefore also necessary to control electro-valves directing hydraulic fluid under pressure in the rams which operate to advance and return the slide.

For an operation of this kind, the following set of circumstances and associated verification signals are defined:

A1 — The work piece is in the correct position for being machined;

A2 — The motor of the boring tool must be energized;

A3 — The pump supplying pressurized fluid for the slide rams must be operating, i.e. there must be pressure in the hydraulic fluid circuit;

B — The slide carrying the boring tool must advance for a given travel corresponding to the bore to be machined in the work piece, i.e. for effecting the machining operation;

C — The slide carrying the boring tool must return to the initial position.

The above set of circumstances and verification signals are implemented as follows. Suitable transducers (not shown) provide signals if the work piece is positioned (A1), if the motor of the boring tool is energized (A2), and if pressure in the hydraulic fluid circuit is adequate (A3). These signals, translated into levels suitable for operating the logic circuitry of FIGS. 4a and 4b (i.e. interfaced) are brought as inputs to an AND gate (not shown). The output of the AND gate forms the COIC (consent to cycle start) signal in FIG. 4a.

The system is at that point ready to effect the machining operation. In fact, the COIC system is coupled through X1 and X2 as shown in FIG. 4a and provides (at connected T1) a READY TO CYCLE signal which can be used to apprise either a human operator or a process computer of the system status. At a suitable moment a CYCLE signal is coupled from a centralized general control board through the connector T1. As already explained, the CYCLE signal puts the circuitry on STEP 1. The signal present on the x, y terminals at STEP 1 as shown in FIG. 4a controls the supply of hydraulic fluid to the ram advancing the slide carrying the boring tool. When th slide has traversed the required path, an appropriate sensor such as a limit switch, produces the signal z at STEP 1. The presence of the signal z at STEP 1 means that the machining has been effected, and signal z causes the passage of the system to STEP 2.

The signal present on x, y at STEP 2 controls a valve which causes the ram of the slide to be supplied with hydraulic fluid in a sense reversed to the one existing during the machining for the purpose of bringing the slide back to the initial position. When such position is reached, a limit switch produces the signal z at STEP 2 which causes the passage to STEP 3. The signal x, y of STEP 3 is brought to the RESET line, which halts the whole operation and returns the system to the initial conditions. Thus a complete cycle of the apparatus has taken place.

While the above description relates to an exemplary simple application to which the system of the invention can be applied, the same considerations apply to its application in situations where a large number of sequential operating steps are required.

It will be appreciated that the programming board between the step-by-step programmer of FIGS. 4a and 4b and the machine tool cannot be defined in exact terms for general application inasmuch as the required programming board is dictated by the variables and specific available signals for specific machines. It is sufficient to say that the programming board must translate signals representing a position, a running condition, the presence of a pressure, a flow of refrigerant and so on into electrical signals compatible with the logic circuits associated with the programming board.

It is deemed unnecessary to enter into the details of the structure of the programming board which will be inserted into the connector CS. As aforesaid this will include a group of diodes, for known reasons, which will direct the various signals entering into, or issuing from, the circuit. Suitably, it will be possible to provide and render available auxiliary operators, such as the inverters I1, I2, the delay circuits MS1, MS2 for embodying logic supplemental operations on the programming board.

Having thus described the present invention, what is claimed is:

1. A control system for a plurality of machine work stations of the type where each machine station performs one or more operations on a workpiece comprising a central unit for controlling the plurality of machine work stations, a plurality of local control units coupled to and actuated by said central unit, each of said local control units controlling one or more machine work stations, each of said local control units comprising a step-by-step programmer operatively associated with one or more machine work stations and generating a sequential series of control signals, each of said local control units further including a hard-wired logic unit tailored to a particular one or more machine work stations to produce step-by-step a pre-selected sequence of machine signals in response to said sequential series of control signals, and interface means coupling said machine signals to the one or more machine work stations with which said particular step-by-step programmer is operatively associated.

2. A control system as in claim 1 wherein said hard-wired logic units are each a replaceable unit separately configured to produce a particular sequence of machine signals for a particular machine work station in response to said sequential series of control signals.

3. A control system as claimed in claim 1 wherein said step-by-step programmer comprises a plurality of bistable memory elements which are sequentially controlled by feedback signals from the machine work station they control, so that each succeeding control signal in said sequential series is generated only upon receipt of a feedback signal from the machine work station indicating completion of the machine operation responsive to the previous control signal.

4. A control system as claimed in claim 1 wherein said hard-wired logic units tailored to a particular one or more machine work stations comprises a group of diodes interconnected in a known way to translate said control signals to machine signals and to translate machine feedback signals from the machine work station to control signals, all in accordance with a sequence predetermined by the type of machine work station which is controlled.

5. A control system as claimed in claim 1 wherein said step-by-step programmer includes means for discriminating an automatic operation from a manual control operation.

6. A system as claimed in claim 5 wherein said step-by-step programmer includes memory means associated with said means for discriminating manual control operation, said memory means impeding sequential generation of the next in the series of control signals without the positive intervention of an operator since generation of the last in the series of control signals.

* * * * *